United States Patent

[11] 3,586,172

| [72] | Inventor | Douglas L. G. Young<br>Pierrefonds, Quebec, Canada |
|------|----------|---------------------------------|
| [21] | Appl. No. | 721,840 |
| [22] | Filed | Apr. 16, 1968 |
| [45] | Patented | June 22, 1971 |
| [73] | Assignee | Canadian Ingersoll-Rand Company, Limited<br>Montreal, Quebec, Canada |

[54] SCREENING APPARATUS
11 Claims, 4 Drawing Figs.

[52] U.S. Cl. .................................... 210/415, 209/273
[51] Int. Cl. ........................................ B01d 33/02
[50] Field of Search ........................................ 210/304, 333, 338, 342, 345, 409, 412, 380, 512; 209/243, 273

[56] References Cited
UNITED STATES PATENTS

| 3,363,759 | 1/1968 | Clarke-Pounder | 209/273 |
| 3,458,038 | 7/1969 | Young | 209/273 X |

*Primary Examiner*—Reuben Friedman
*Assistant Examiner*—T. A. Granger
*Attorneys*—Carl R. Horten and David W. Tibbott ABSTRACT: Pressure screening apparatus in which a rotor having a zoned pulse-generating wall member cooperates with a screen member provided with circumferential imperforate and perforate portions to control the velocity of the pulp flowing through the passage formed between the rotor wall member and the screen member, the screen member having a single dilution liquid opening in one of the imperforate portions thereof.

INVENTOR
DOUGLAS L. G. YOUNG

INVENTOR
DOUGLAS L. G. YOUNG

SCREENING APPARATUS

This invention relates to the art of screening mixtures of fibrous material and liquid, and more in particular to the art of screening paper making pulps.

Prior-art screening apparatus employed in either a screening operation handling mixtures of fibrous material and liquid having a debris content or in a subsequent screening step have suffered from a number of serious limitations. One of the principal limitations is the inability to produce a paper stock, before being allowed to flow onto the forming wire, free of undesirable matter, or at least with a relatively low content of debris. Another principal limitation is the inability to effectively separate debris from the mixture of fibrous material and liquid to avoid the loss of good fibers. Another limitation in prior-art screening apparatus is the inability to remove inefficiencies resulting from the introduction of dilution liquid into the mixture of fibrous material and liquid flowing through the fluid passage formed between the screen and the rotor.

The proportion of debris in the accepts portion resulting from debris separation in presently known screening apparatus, the accepts portion being that portion of the mixture of fibrous material and liquid flowing through the screen, has been reduced substantially. However, this proportion of debris could be further reduced in order to improve the ultimate quality of the paper pulp. In addition thereto, the rejects portion, that portion of the mixture of fibrous material and liquid rejected by the screen, contains a substantial proportion of good fibers, and additional screening steps are required if loss of the good fibers is to be avoided.

Furthermore, in presently known screening apparatus the introduction of dilution liquid into the fluid passage formed between the screen and rotor is achieved by introducing the dilution liquid under pressure radially through the screen and into the fibrous material in the said fluid passage. This arrangement is unsatisfactory due to the forming at desirable flow rates of a hydraulic barrier interfering with the flow of the mixture of fibrous material and liquid through the said fluid passage and resulting in debris concentration and low degree of debris separation, plugging of the screen, and reduced accepts flow.

Accordingly, the principal object of this invention, in either a screening operation handling material having a relatively high debris content or in a subsequent screening step, is to improve the efficiency of screening to reduce the minimum percentage of rejects substantially below that achieved in presently known screening apparatus.

Another principal object is to obtain a substantially less percentage of debris in the accepts than achieved in presently known screening apparatus.

Another important object is to improve the arrangement of introduction of dilution liquid through the screen and into the mixture fibrous material and liquid flowing through the fluid passage formed between the screen and the rotor.

Debris separation, separation of slivers, shives, splinters and foreign matter from the mixture of fibrous material and liquid fed into the screening apparatus, is dependent on many factors such as inlet and rejects flows, consistencies, dilution rates, inlet debris content, freeness, and the reject rate relative to the inlet rate, but is mainly a function of the screen and rotor cooperating therewith to create the proper screening action. In this screening action the main controlling factors for high debris separation and efficiency of screening are the tangential velocity of flow of the mixture of fibrous material and liquid through the passage formed between the rotor and the screen, and the action to maintain the screen plate clean for the proper and constant flow of acceptable fibers and liquid therethrough.

If the tangential velocity of the mixture of fibrous material and liquid, translated thereto by the rotor, is lower than the desirable velocity for efficient screening, the debris, and in particular the smaller particles thereof, will be provided sufficient time for alignment with and passage through the apertures of the screen, resulting in a high percentage of debris in the accepts. Furthermore, if the velocity of the rotor is inadequate to translate a desirable tangential velocity for efficient screening to the mixture of fibrous material and liquid, the relative linear velocity of the protrusions on the rotor causes excessively high pulsations resulting in an excessive pressure against the screen and consequent overloading and fatigue failure thereof.

If the tangential velocity of the mixture of fibrous material and liquid to be screened is too high, and near the relative velocity of the rotor, the pulsations along the screen, as a result of the low amplitude thereof, are ineffective in preventing the screen from blinding.

In view of the foregoing, it is apparent that the factor of velocity is of paramount importance, and in order to maintain an acceptable debris separation and screen-cleaning action along the entire length of the screen member, the flow of the mixture of fibrous material and liquid is to be maintained at a relatively high and constant tangential velocity throughout the flow thereof along the entire length of the screen member.

Accordingly, a novel arrangement for the rotor is produced to control the tangential velocity of the mixture of fibrous material and liquid flowing through the passage formed between the screen and the rotor, as well as generating a proper cycle of impulses at the inlet side of the screen to substantially match the aforesaid tangential velocity of the mixture of fibrous material and liquid.

The aforementioned objects are in general achieved by providing the rotor with a novel pulse-generating rotary wall member having surface deformations in the combined forms of protrusions and depressions. The surface deformations may be arranged on the wall member to define three distinct axially spaced zones, one of said zones including axially spaced circumferential rows of depressions only, one of the other zones including axially spaced circumferential rows of protrusions only, and the other zone including axially spaced circumferential rows of depressions and protrusions.

The objects of this invention are in general further achieved by a novel cylindrical screen member. This screen member, positioned coaxially around and in spaced relationship to the pulse-generating wall member, may be provided with an imperforate portion encircling the entire circumference of the screen member. The dilution liquid to dilute the mixture of the fibrous material and liquid flowing through the fluid passage formed between the screen member and the pulse-generating rotary wall member may be conducted through the imperforate portion of the screen and through a single opening therein.

The preferred embodiment of the invention is illustrated by way of example in the accompanying drawing in which.

Figure 1:
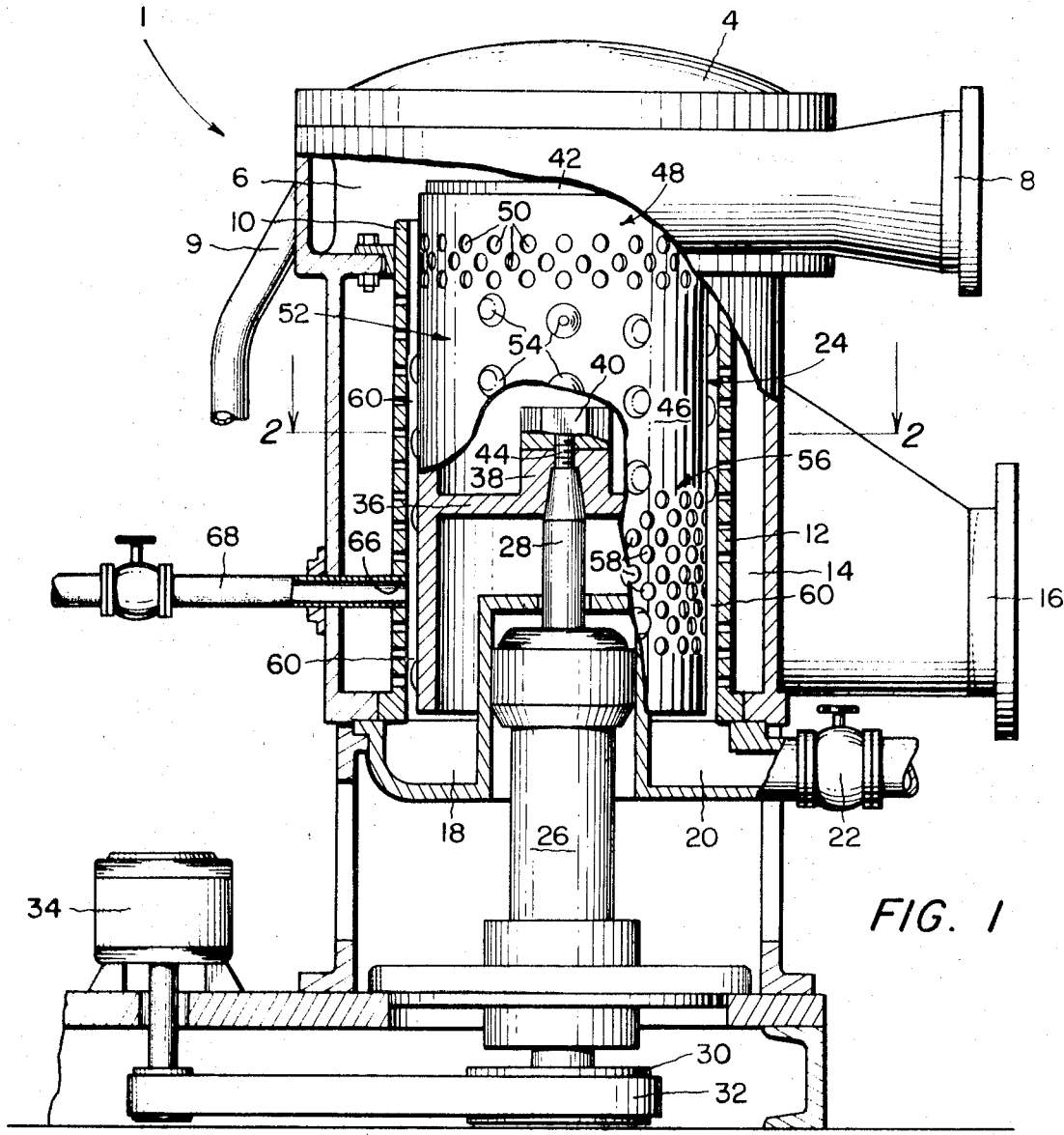
FIG. 1 is an axial vertical longitudinal section of the screening apparatus according to the invention.
Figure 2:
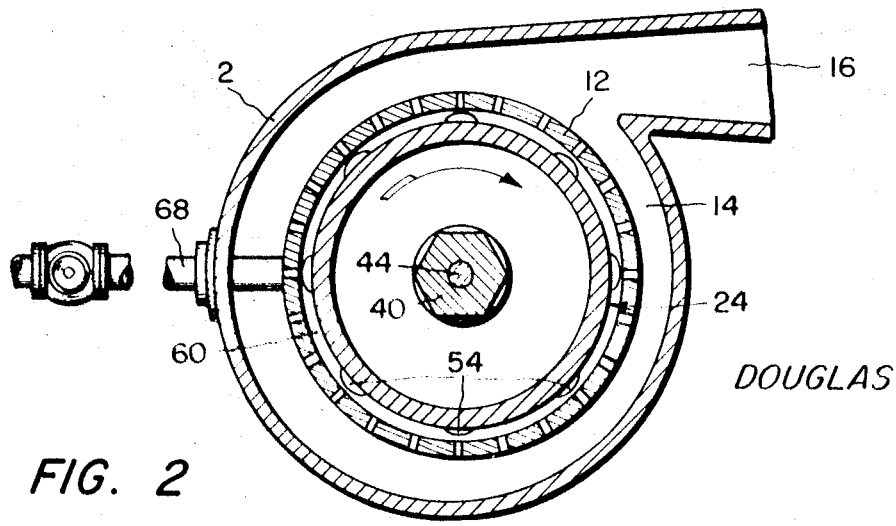
FIG. 2 is a cross section along line 2—2 of FIG. 1.

The screening apparatus 1 shown in FIGS. 1 and 2 includes a vertically arranged pressure casing 2 including a removable pressure dome 4. An annular inlet gutter 6 is defined in the upper region of the casing 2 and an inlet conduit 8 is arranged to introduce pulp to be screened into the inlet gutter 6. A gutter trap 9 communicates with the inlet gutter 6 for removing heavy debris and tramp material thrown to the periphery by centrifugal force.

The inlet gutter 6 communicates radially over a baffle 10 with the central part of the screening apparatus. Below the baffle 10 is located a circumferential, stationary, apertured screen member 12 whose walls are spaced inwardly relative to the casing 2, so as to define an annular accepts chamber 14 outside of the screen member 12. A tangential accepts conduit 16 adapted to remove fluid under substantial pressure is connected to the accepts chamber 14, having its initial portion extending the full height of the screen member 12. The stationary screen member 12 may be of the usual forms for fine screening, e.g., it can have 23 percent open area provided by circular holes of one-sixteenth inch diameter spaced in a staggered pattern, or may be of the slotted type.

Below the screen member 12 is arranged an annular rejects gutter 18 in communication with the inside of the cylindrical screen member 12. A rejects conduit 20 communicates with this rejects gutter 18, this conduit being capable of removing fluid under substantial pressure and being provided with a valve 22 which serves to regulate the flow therethrough.

FIG. 2 illustrates that the pressure casing 2 is slightly scroll shaped in horizontal cross section, and the screen member 12 is arranged therein so that the accepts chamber 14 increases in radial width gradually about its circumference, all the way along its extent until it discharges to the accepts conduit 16.

The screening apparatus 1 further includes a rotor 24 of circular cross section mounted inside of and substantially concentric with the cylindrical screen member 12. In an example embodiment of this apparatus, the rotor 24 is generally of cylindrical shape, has a height greater than that of the total length of the screen member 12 and the baffle 10 extending upwardly therefrom, is continuous peripherally and has a diameter slightly smaller than the screen member, to provide a clearance or passage therebetween. Regarding the details of mounting in this preferred embodiment, the rotary rotor 24 is mounted upon a rotary shaft 28 which extends through a stationary bearing pedestal 26. For this purpose, two vertically spaced-apart sets of bearings (not shown) are employed in the pedestal, one or both of which can take the axial thrust applied to the rotor 24.

The lower end of the rotary shaft 28 extends below the bearing pedestal 26 and carries a pulley 30. This pulley is driven by a belt 32, or a series of belts, from a motor 34 capable of rotating the rotor 24, e.g., to develop a surface speed of about 6,000 f.p.m. when the screening apparatus 1 is full of material to be screened.

Referring still to FIG. 1, preferably the rotor 24 has a central web 36, located substantially midway between its ends, at least near its center of gravity, joined to a hub 38 which is removable mounted upon rotary shaft 28 by means of a mounting nut 40 threaded on the threaded end 44 of the rotary shaft 28. The upper end of the rotor 24 is provided with a cover 42.

A fluid passage 60 is formed between the rotor 24 and the screen member 12 and baffle 10 extending therefrom to receive the mixture of fibrous material and liquid from the inlet gutter 6. The fluid passage 60, as shown in FIGS. 1 and 2, has a uniform radial depth due to the fact that both the screen member 12 and the rotor 24 are cylindrical.

Figure 3:
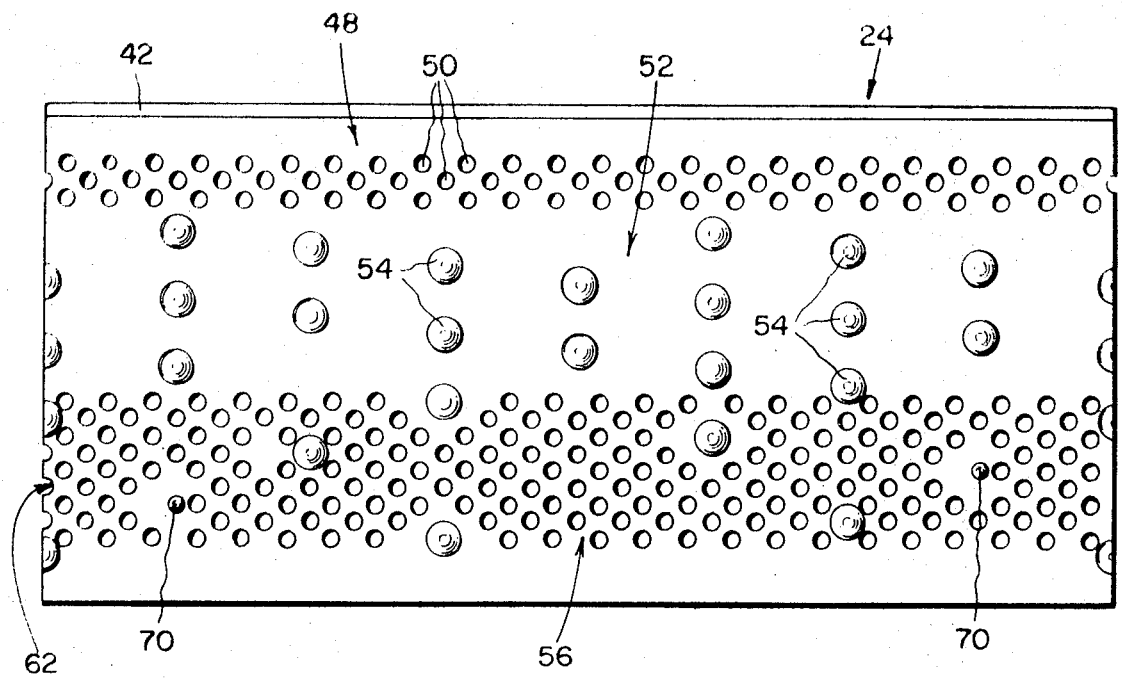
FIG. 3 is the developed surface configuration of the rotary wall member according to the invention.

According to the invention, the rotor 24 includes a wall member 46 having surface deformations in the form of depressions and protrusions defining preferably three distinct axially arranged zones 48, 52 and 56, as shown in FIGS. 1 and 3. The aforementioned surface deformations of zones 48, 52 and 56 serve to create and maintain a predetermined tangential velocity of flow for the mixture of fibrous material and liquid along the entire height of the screen member 12, as well as the proper pulsations for an acceptable debris separation and efficient screen-cleaning action, as will be explained hereinafter.

The upper zone 48 is defined by preferably three axially spaced circumferential rows of depressions only, the depressions of zone 48 being designated numeral 50, each depression extending inwardly from the surface of the wall member 46 of rotor 24. The circumferential rows of depressions 50 are evenly spaced in an axial direction and are located radially adjacent baffle 10 at the upper end portion of fluid passage 60. The depressions of each circumferential row are evenly spaced from and circumferentially in alignment with each other in the direction of movement of the rotor, but staggered in an axial direction relative to the depressions of an axially adjacent row.

Zone 52, arranged axially adjacent zone 48, or may be spaced therefrom, is defined by circumferential rows of protrusions only, the protrusions of zone 52 being designated numeral 54, each protrusion extending outwardly from the surface of the wall member 46 of rotor 24 and into the fluid passage 60. Protrusions 54 are positioned in a pattern, as shown in FIG. 3, defined by a plurality of circumferential rows, the axis of each row of protrusions being sloped relative to the direction of movement of the rotor. The slope is preferably an 8° inclination circumferentially relative to the direction of movement of the rotor. In an axial direction, the protrusions of each row are axially aligned with the protrusions of the axially adjacent row while the protrusions of each circumferential row are evenly spaced from one another.

Zone 56, arranged axially adjacent zone 52, is defined by preferably nine circumferential rows of surface deformations positioned in a pattern as shown in FIG. 3. The circumferential rows of surface deformations are evenly spaced in an axial direction. The surface deformations of each circumferential row are circumferentially evenly spaced and aligned with each other in the direction of rotation of the rotor while, in an axial direction, the surface deformations of one circumferential row are staggered relative to the surface deformations of an axially adjacent circumferential row. It is to be noted that one of the circumferential rows of surface deformations of zone 56 is formed by depressions only, this one row of depressions only is designated numeral 62, while each of the other circumferential rows is formed by depressions and one protrusion. The protrusions in these rows are positioned along axes extending from the sloping axes of the protrusions of zone 52.

The one circumferential row 62 of only depressions in zone 56 of wall member 46 is provided for purposes related to the introduction of dilution liquid under pressure into that portion of the fluid passage 60 adjacent row 62, and will be explained hereinafter.

According to another feature of the invention, the screen member 12 is provided with an imperforate portion in the form of a band 64 encircling the screen member. Centrally of the imperforate band 64 of the screen member 12 is provided an opening 66 to which is attached a conduit 68 for the conductance of dilution liquid through the screen member and into the fluid passage 60 formed between the rotor 24 and screen member 12. Conduit 68 terminates flush with the inner surface of the screen and is positioned radially opposite the one row of depressions only, row 62. This arrangement is made to avoid impingement of the dilution liquid against a protrusion, were this included in row 62. It was learned that, under certain conditions in the prior art, the dilution liquid introduced under pressure into the passage formed between the screen and rotor penetrates the material in said fluid passage and impinges against those protrusions on the rotor opposite the dilution inlet, causing objectionable vibration and noise resembling "diesel knock." In view thereof, according to the invention, the circumferential row of surface deformations on rotor 24 radially adjacent the introduction of dilution liquid is defined by depressions only.

OPERATION

Rotor 24 is rotated by electric motor 34 through the rotary shaft 28, pulley 30, and belt 32. The mixture, of fibrous material and liquid or paper-making pulp containing debris is conducted under pressure through inlet conduit 8 into the inlet gutter 6 circumferentially around baffle 10. The heavy debris, by centrifugal force, is forced against the inlet gutter wall and flows into gutter trap 9 from where it is discharged. The mixture of fibrous material and liquid from which the heavy debris is now removed flows inwardly over baffle 10 and into the upper portion of fluid passage 60 formed between the upper portion of rotor 24 and the baffle 10 extending upwardly from screen member 12. Rotation of the rotor, and in particular the action of the depressions in the upper zone 48 of the rotor causes the mixture of fibrous material and liquid to be actuated into a predetermined desirable screening velocity prior to its flow along the screen member 12, and thus prior to being subjected to screening. This actuation of the mixture of fibrous material and liquid into a desirable screening velocity prior to screening increases considerably the efficiency of screening relative to prior-art apparatus in which the proper screening velocity of the mixture of fibrous material and liquid is reached after initiation of screening.

It is to be noted that the means to actuate the mixture of fibrous material and liquid into a desirable screening velocity prior to screening is in the form of axially arranged circumferential rows of depressions only.

After being actuated into a desirable screening velocity by zone 48 of the rotor, screening is initiated, and the mixture of fibrous material and liquid flows into that portion of fluid passage 60 radially adjacent the upper portion of the screen member 12 and zone 52 where it is subjected to screening by the tangential flow thereof along the screen member 12 and the action thereupon of the protrusions of zone 52 of the rotor 24. The protrusions of zone 52 produce localized turbulences for purposes of fluidizing the mixture of fibrous material and liquid in order to prevent the fibers from forming clusters. The pattern in which the protrusions of zone 52 are positioned, as shown in FIG. 3, causes the paths of movement of the protrusions, in the direction of rotation of the rotor, to overlap, this overlapped relation existing over the entire area of that portion of the screen member radially adjacent zone 52 so that every point of the said portion of the screen member is along the path of movement of at least one protrusion. Because of the overlapping relationship in positioning of the protrusions the entire area of that portion of the screen member radially adjacent zone 52 is subjected to impulses of high frequency necessary to maintain the screen clean. It is to be noted that the protrusions of zone 52, positioned in a pattern, as shown in FIG. 3 and hereinbefore explained, maintain in the related portion of the fluid passage 60 the tangential velocity of flow of the mixture of fibrous material and liquid previously obtained by zone 48 in that portion of fluid passage 60 prior to screening.

The flow of the mixture of fibrous material and liquid continues into that portion of fluid passage 60 radially adjacent zone 56 of rotor 24. In this portion of passage 60 the depressions mainly, and the protrusions to a lesser degree, because of the multiplicity of depressions relative to the number of protrusions, maintain the velocity of the mixture of fibrous material and liquid obtained in that portion of fluid passage 60 related to zone 52. Mainly, the protrusions in zone 56 serve to create impulses to prevent the screen portion related to zone 56 from plugging.

Because of the increase of consistency of the fibrous material to be screened in the lower portion of fluid passage 60, zone 56 includes additional rows of depressions relative to the rows of depressions in zone 48 at the upper end portion of fluid passage 60. In zone 56 of rotor 24, the protrusions are positioned along the extended slope axes of the protrusions of zone 52, and are so distributed to include a protrusion in each circumferential row of depressions, except one row of depressions 62 only. This arrangement is made to insure that every point of the screen portion related to zone 56 is along the path of movement of one protrusion so that the desirable screening efficiency is maintained in the fluid passage portion related to zone 56.

Figure 4:
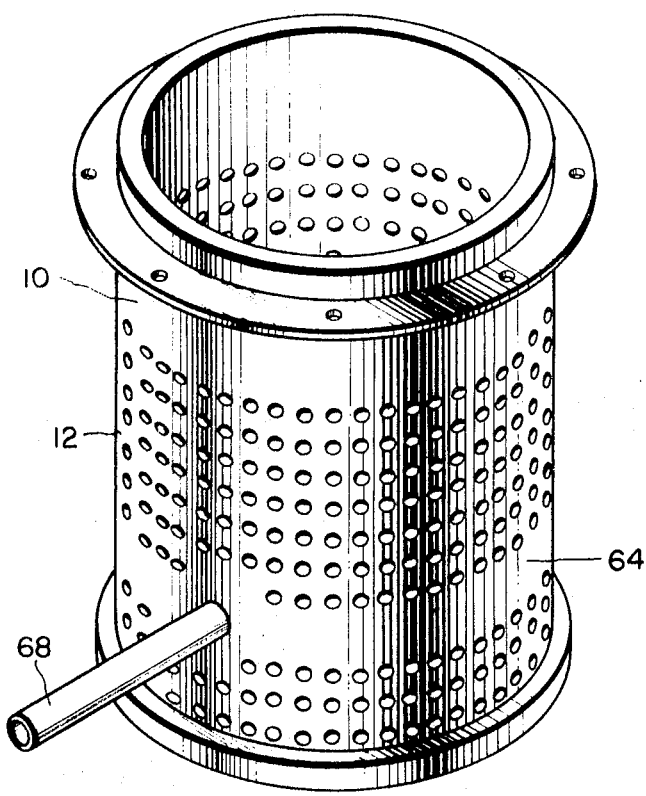
FIG. 4 is a perspective view of the screen member according to the invention.

The consistency of the material to be screened increases as it continues flowing through that portion of fluid passage 60 related to zone 56, and in order to maintain a desirable screening efficiency, dilution liquid is introduced into passage 60. Dilution liquid is introduced through a conduit 68 extending through an opening 66 provided in screen member 12, the discharge end of conduit 68 being flush with the inner face of the screen member to avoid obstruction of the flow of the material through the related portion of fluid passage 60. As shown in FIG. 4, dilution liquid conduit 68 is positioned centrally of an imperforate portion 64 provided in the screen member, this imperforate portion being in the form of a band encircling the screen member and positioned radially adjacent the circumferential row 62 of zone 56. Circumferential row 62, unlike the other rows of surface deformations of zone 56, does not include a protrusion since inclusion of a protrusion in row 62 would cause the dilution liquid introduced under pressure radially opposite row 62 to impinge against the protrusion creating objectionable noise and vibration. Since row 62 does not include a protrusion, the impulses created by the depressions only are greatly reduced, relative to those created by the rows of depressions including a protrusion, and since reduction of impulses by row 62 would affect the screening action of the related portion of the screen member, that portion of the screen member, designated 64, is made imperforate.

The arrangement of the imperforate portion 64 of the screen member serves another purpose, namely, to avoid the interference of the flow of the fibrous material along that portion of the screen member exposed to the introduction of dilution liquid. This interference with resultant ineffectiveness of that portion of the screen member exposed to the dilution liquid is caused by the forming of a hydraulic barrier resulting in debris concentration and low degree of debris separation, plugging of the screen member, and reduced accepts flow. With the novel arrangement of the imperforate portion 64 of the screen member, the ineffective portion of the screen member exposed to the introduction of dilution liquid is eliminated, and the fibrous material is allowed to flow past the imperforate portion 64 of the screen member without affecting the overall function of the screen member and the velocity of flow of the fibrous material through passage 60.

After flowing past the imperforate portion 64 of the screen, the mixture of fibrous material and liquid is again subjected to the action caused by the lower portion of zone 56 to maintain the velocity of flow of the fibrous material while creating the proper impulses for a final effective screening thereof.

It is to be noted that the rows of depressions axially adjacent row 62, the rows straddling row 62, include each a protrusion 70 which is of smaller diameter than the other protrusions 54 of zone 56 or those of zone 52. This arrangement is made to decrease the width of sweep of protrusions 70 in order to avoid impingement of the dilution liquid thereagainst, and consequently, to provide for a relatively narrow width of the imperforate portion 64 of the screen member.

Subsequently, the debris completely rejected by the screen flows into rejects gutter 18 from where it is discharged through rejects conduit 20 and valve 22 which is provided to control the flow of such discharge.

Although one embodiment of the invention is illustrated and described in detail, it is pointed out that the invention is not limited simply to this one embodiment but contemplates other embodiments and variations which utilize the concepts and teachings of this invention.

I claim:

1. An apparatus for screening a mixture of fibrous material and liquid to separate the fibrous material into an accepts portion and a rejects portion, comprising an annular screen having openings adapted for accepting the accepts portion of the fibrous material and rejecting the rejects portion thereof, a rotatably driven annular wall member extending circumferentially along said screen and spaced therefrom by an annular fluid passage longitudinally between said wall member and said screen, inlet means communicating with one end of said fluid passage for supplying the mixture to said fluid passage at said one end thereof, rejects outlet means communicating with the other end of said fluid passage for discharging the rejects portion rejected by said screen openings from said other end of said fluid passage, and accepts outlet means for discharging the accepts portion accepted by said screen openings, said wall member including a plurality of distinct circumferential zones arranged longitudinally of said wall member and bounding said fluid passage, a first of said zones basically comprising a plurality of circumferential rows of depressions around said wall member, another of said zones basically comprising a plurality of circumferential rows of protrusions around said wall member and a third of said zones comprising circumferential rows of depressions therearound, said first of said zones being adjacent said one end of said fluid passage, said third of said zones being spaced longitudinally of said wall member from said first of said zones and said another of said zones being intermediate said first and third of said zones.

2. A screening apparatus according to claim 1, further comprising dilution liquid inlet means for supplying dilution liquid to said fluid passage intermediate the ends thereof, said third circumferential zone of said wall member having at least a portion intermediate said one end of said fluid passage and the means to supply dilution liquid thereto.

3. An apparatus for screening a mixture of fibrous material and liquid to separate the fibrous material into an accepts portion and a rejects portion, comprising an annular screen having openings adapted for accepting the accepts portion of the fibrous material and rejecting the rejects portion thereof, a rotatably driven annular wall member extending circumferentially along said screen and spaced therefrom by an annular fluid passage longitudinally between said wall member and said screen, inlet means communicating with one end of said fluid passage for supplying the mixture to said fluid passage at said one end thereof, rejects outlet means communicating with the other end of said fluid passage for discharging the rejects portion rejected by said screen openings from said other end of said fluid passage, accepts outlet means for discharging the accepts portion accepted by said screen openings, said wall member having one circumferential end portion adjacent said one end of said fluid passage and the other circumferential end portion adjacent said other end of said fluid passage and said wall member having a circumferential intermediate portion between said circumferential end portions, said one circumferential end portion of said wall member having surface deformations basically comprising a plurality of circumferential rows of depressions therearound and said other circumferential end portion of said wall member also having a plurality of circumferential rows of depressions therearound, and said circumferential intermediate portion of said wall member having surface deformations basically comprising a plurality of circumferential rows of protrusions therearound.

4. A screening apparatus according to claim 3, wherein said screen is provided with an annular baffle at said one end of said fluid passage opposite the depressions on said one circumferential end portion of said wall member.

5. A screening apparatus according to claim 3, wherein said screen is provided with an annular baffle opposite said other circumferential end portion of said wall member, and a dilution inlet is provided in said annular baffle for discharging dilution liquid to said fluid passage.

6. A screening apparatus according to claim 5, wherein said other circumferential end portion of said wall member has a plurality of protrusions at locations spaced circumferentially therearound intermediate its said depressions.

7. A screening apparatus according to claim 6, wherein said protrusions on said other circumferential end portion of said wall member are located longitudinally of such end portion whereby the area of such end portion opposite said dilution inlet is free of such protrusions.

8. A screening apparatus according to claim 3, wherein the length of said one circumferential end portion of said wall member is, in the longitudinal direction of said wall member, substantially shorter than the lengths of the other two said circumferential portions in the longitudinal direction of said wall member.

9. A screening apparatus according to claim 3, wherein said protrusions are larger than said depressions.

10. An apparatus for screening a mixture of fibrous material and liquid to separate the fibrous material into an accepts portion and a rejects portion, comprising an annular screen having openings adapted for accepting the accepts portion of the fibrous material and rejecting the rejects portion thereof, a rotatably driven annular wall member extending circumferentially along said screen and spaced therefrom by an annular fluid passage longitudinally between said wall member and said screen, said screen and said wall member being arranged on generally vertical axes such that said fluid passage longitudinally extends generally vertically, said wall member having circumferential upper and lower end portions adjacent the upper and lower ends of said fluid passage respectively and also having a circumferential intermediate portion between said circumferential end portions, inlet means communicating with the upper end of said fluid passage for supplying the mixture to said fluid passage at said upper end thereof, rejects outlet means communicating with the lower end of said fluid passage for discharging the rejects portion rejected by said screen openings from said lower end of said fluid passage, accepts outlet means for discharging the accepts portion accepted by said screen openings, said circumferential upper end portion of the said wall member having surface deformations at least basically comprising a plurality of circumferential rows of depressions therearound and said screen opposite said circumferential upper end portion being provided with an annular baffle, said circumferential lower end portion of said wall member having a plurality of circumferential rows of depressions therearound and a plurality of protrusions located between such depressions, said screen being provided with a second annular baffle opposite said circumferential lower end portion and having a dilution inlet for supplying dilution liquid therethrough to said fluid passage, said protrusions on said circumferential lower end portion of said wall member being located whereby the area of said circumferential lower end portion opposite said dilution inlet is free of such protrusions, and said circumferential intermediate portion of said wall member having surface deformations at least basically comprising a plurality of circumferential rows of protrusions therearound.

11. A screening apparatus according to claim 10, wherein the length of said circumferential upper end portion of said wall member is, in the longitudinal direction of said wall member, substantially shorter than the lengths of the other two said circumferential portions in such longitudinal direction, and said protrusions of said intermediate portion are larger than said depressions and at least some of said protrusions of said circumferential lower end portion.